May 7, 1929. E. O. HAMREN 1,712,224
WATER SUPPLY SYSTEM AND VALVE THEREFOR
Filed Oct. 25, 1926 4 Sheets-Sheet 2
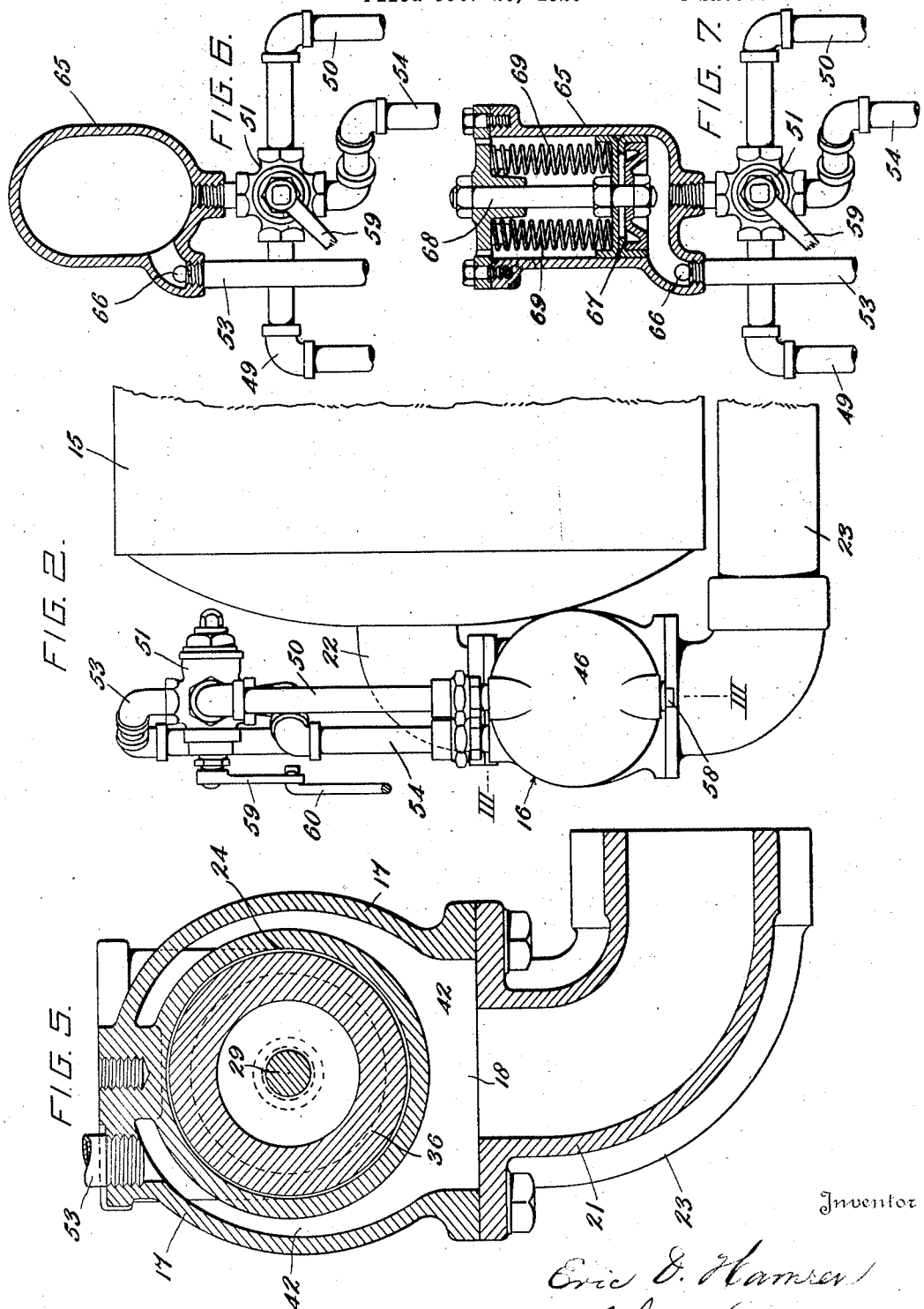

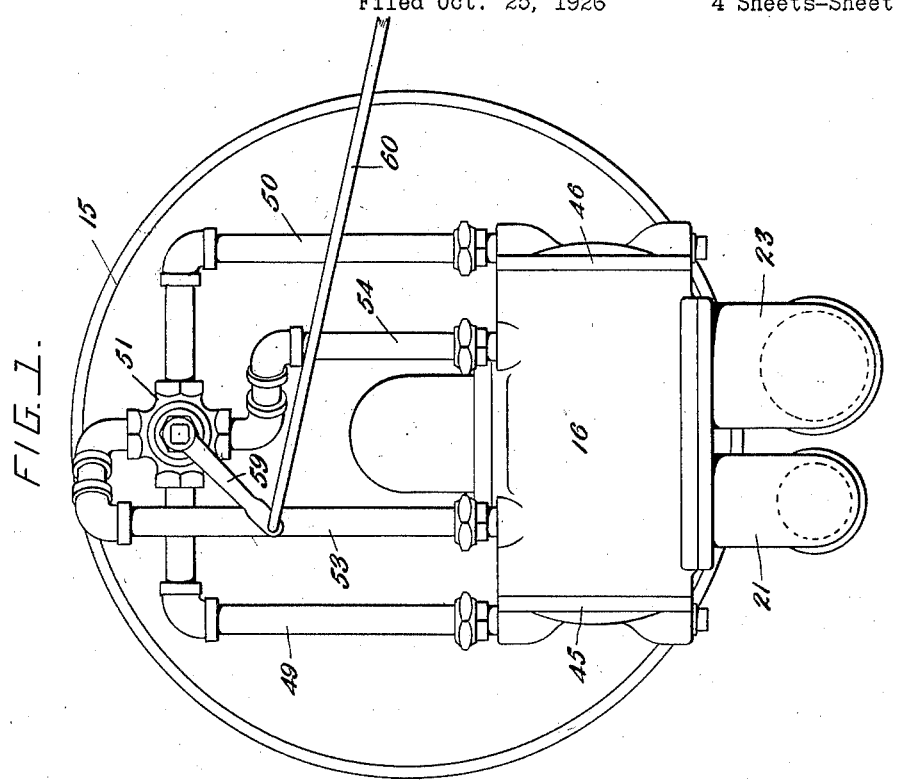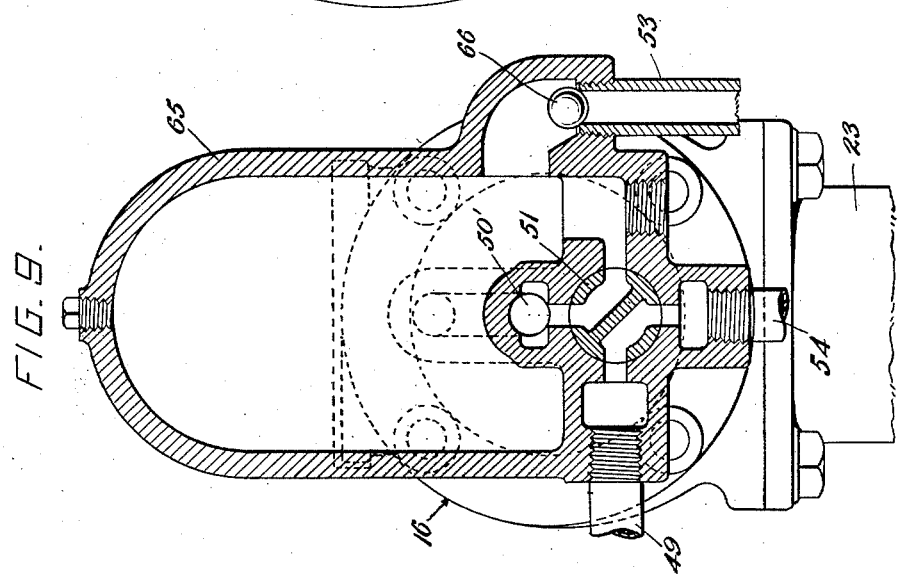

May 7, 1929. E. O. HAMREN 1,712,224
WATER SUPPLY SYSTEM AND VALVE THEREFOR
Filed Oct. 25, 1926 4 Sheets-Sheet 3

Inventor
Eric O. Hamren
By John S. Barker
Attorney

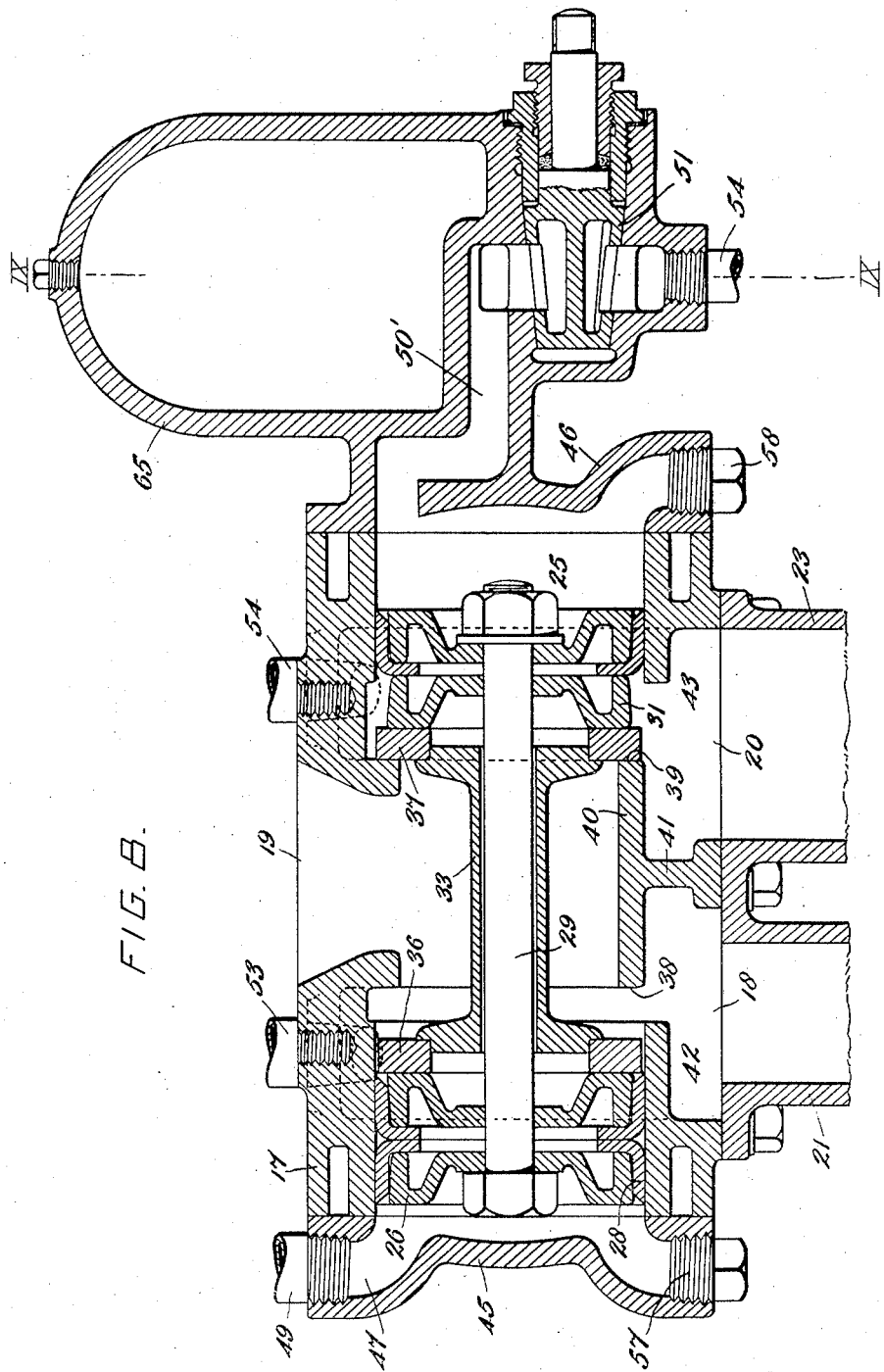

Patented May 7, 1929.

1,712,224

UNITED STATES PATENT OFFICE.

ERIC O. HAMREN, OF MILWAUKEE, WISCONSIN, ASSIGNOR TO CHAIN BELT COMPANY, OF MILWAUKEE, WISCONSIN, A CORPORATION OF WISCONSIN.

WATER-SUPPLY SYSTEM AND VALVE THEREFOR.

Application filed October 25, 1926. Serial No. 144,028.

This invention relates to pressure actuated balanced valves and more especially to a valve of this type for use in connection with the water supply systems of concrete mixers and the like and has for one of its objects to provide a device of this character which will be simple in construction, comparatively inexpensive to manufacture and install and more efficient in use than those which have been heretofore proposed.

A further object of the invention is to provide a water supply system for concrete mixers which are located at considerable distances from the source of water supply and which according to common practice are connected therewith by comparatively long pipe lines, wherein provision is made to cushion the water when it is cut off by the valve, to the end that the knocking or so called water hammer, common to such systems may be eliminated.

With the above and other objects in view which will appear as the description proceeds the invention consists in the novel details of construction and combinations of parts more fully hereinafter described and particularly pointed out in the appended claims.

Referring to the accompanying drawings forming a part of this specification in which like reference characters designate like parts in all the views:

Figure 1 is a side elevational view of a pressure actuated balanced valve constructed in accordance with the present invention, together with its pilot valve and connecting piping as applied to the water receiving tank or receptacle of one form of the well known concrete mixer;

Fig. 2 is an end elevational view of the valve and associated parts shown in Fig. 1;

Fig. 5 is a transverse sectional view taken approximately on the plane indicated by the line V—V of Fig. 3;

Fig. 6 is a detail sectional elevational view of a slightly modified form of the invention showing an air cushioning chamber associated with the pilot valve;

Fig. 7 is a view similar to Fig. 6 showing a further slightly modified form of the invention wherein the cushioning chamber is provided with a spring pressed piston for assisting in the functioning of the master valve;

Fig. 8 is a central vertical sectional view similar to Fig. 3 of a somewhat modified form of the master valve in which the cushioning air chamber and the pilot valve are incorporated into the master valve structure; and, Fig. 9 is a transverse sectional view taken approximately on the plane indicated by the line IX—IX of Fig. 8.

Figure 3:
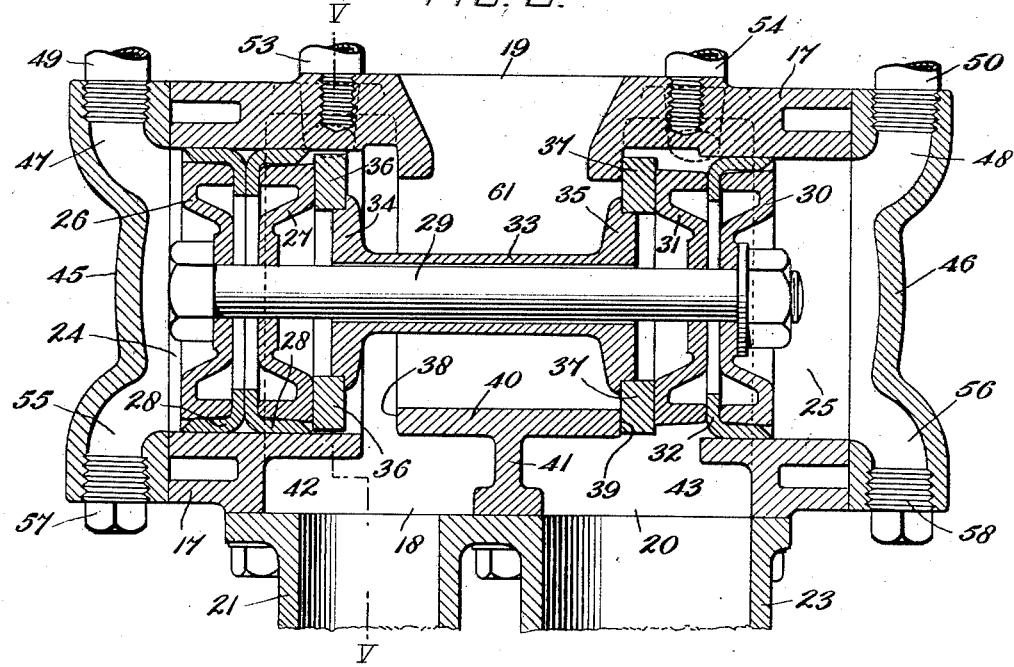
Fig. 3 is an enlarged central vertical sectional view of the master valve taken approximately on the plane indicated by the line III—III of Fig. 2.
Figure 4:
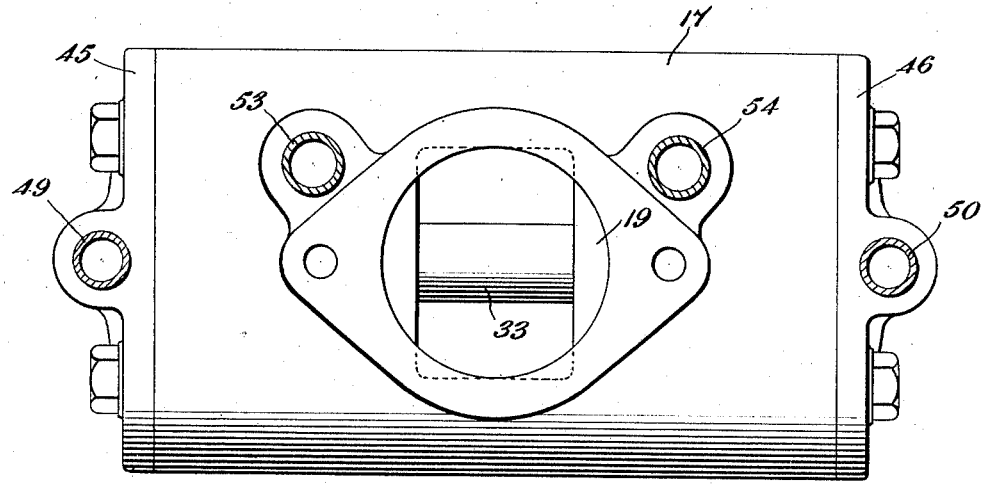
Fig. 4 is a top plan view of the master valve with the connections omitted.

Referring more particularly to Figs. 1 to 5 inclusive, the numeral 15 indicates a water receiving tank or receptacle such for example, as the usual receptacle of a concrete mixer adjacent which is mounted the master water controlling valve 16. This valve as will be clear from Fig. 3 comprises a casing or body 17 which is provided with an inlet port 18, an outlet port 19 substantially diametrically opposite the port 18 and a second outlet port 20 adjacent to the port 18. The inlet port 18 is connected by means of a pipe 21 with any suitable source of water supply while the port 19 may be connected as by an elbow or pipe 22 with the tank or receptacle 15 and the port 20 is connected by means of a pipe 23 with the mixing drum of the concrete mixer.

As above indicated the master or control valve is of the pressure operated balance type wherein the valve heads are moved to and from their seats by pistons which are actuated by the pressure of the water which may be taken from the supply line. To this end the valve body 17 is bored axially to provide a pair of cylinders 24 and 25 in which the actuating pistons are adapted to slide. The piston in the cylinder 24 as shown in Fig. 3, comprises a pair of spaced heads or disks 26 and 27 between which is mounted a pair of cupped washers or packing members 28. The said heads 26 and 27 are mounted upon an axially extending piston rod 29 which carries at its other end a pair of heads 30 and 31 between which is clamped a cupped packing or washer member 32.

The piston rod 29 also carries intermediate the actuating pistons, a spool 33 provided with the end flanges 34 and 35 which carry respectively the valve heads or packings 36 and 37 which abut the piston heads 27 and 31 respectively, as will be clear from Fig. 3. These said valve packings 36 and 37 are adapted to seat alternately against the seats 38 and 39 provided upon an interior annular wall or flange 40 with which the valve body 17 is provided whereby the flow of water from the port 18 to the port 19 and from the port 19 to the port 20 may be controlled, as will appear more fully below. A transverse wall 41 is provided between the outer wall of the valve casing and the inner annular wall 40 thereby dividing the said casing into chambers 42 and 43 and preventing the flow of water directly from the inlet port 18 to the outlet port 20. The ends of the valve body 17 are closed by the end members 45 and 46 which are provided with the passages 47 and 48 respectively which communicate by means of pipes 49 and 50 with a four way pilot valve 51, (see Figs. 1 and 2). Additional pipes 53 and 54 lead respectively from the chambers 42 and 43 of the valve body 17 to the pilot valve 51, and serve as supply and exhaust pipes for the fluid pressure to and from the pistons. The end members 45 and 46 may be further provided with passages 55 and 56 which are closed by drain plugs 57 and 58 whereby the cylinders 24 and 25 may be drained as desired.

The pilot valve 51 may comprise any of the well known forms of four way valves, being here shown for illustrative purposes, as comprising a valve of the rotary plug type. The plug thereof is provided with an operating lever 59 to which is connected a rod or link 60 by means of which the valve plug may be oscillated through an angle of substantially 90° either manually or by an automatic means not shown, if it is desired to automatically control the amount of water introduced into the receptacle 15.

The operation of the device as thus far disclosed is as follows:

With the parts in the positions illustrated in Figs. 1, 2 and 3, the plug of the pilot valve 51 is in such a position as to establish communication between the pipes 53 and 50 and also between the pipes 49 and 54 which will produce the conditions in the master valve indicated in Fig. 3, with the valve packing 37 seated against the seat 39 and the valve packing 36 unseated from its seat 38. This position of the valve results from the fact that water under pressure from the supply pipe 21 has passed through the chamber 42 and pipe 53 to the pilot valve 51 from whence it has been conducted through the pipe 50 and passage 48 to the cylinder 25, exerting a pressure upon the piston head 30 whereby the said piston together with its associated piston rods and valve has been moved toward the left as viewed in Fig. 3 to the positions shown therein. In the meantime any water which was previously in the cylinder 24 behind the piston head 26 has been forced out through the passage 47, pipe 49 and through the pilot valve plug to the pipe 54 from which it has been discharged into the chamber 43, and has passed through the outlet pipe 23 to the mixer. The quantity of water necessary to actuate the valve is quite small and not sufficient to disturb to any appreciable extent, the measured quantity which will be fed to the mixer if an automatic control is employed.

With the parts of the master valve in the positions shown in Fig. 3, water from the supply pipe 21 will pass into the chamber 42 and due to the fact that the valve 36 is open, will pass from the said chamber into the intermediate chamber 61 within the annular flange 40 and thence through the port 19 and connection 22 into the receiver 15. When sufficient water has been thus passed to the receptacle 15, upon actuation of the link 60, either manually or by automatic means, to swing the valve lever 59 toward the right or in a counter clockwise direction, as viewed in Fig. 1, whereby the pilot valve plug will be oscillated to establish communication between the pipes 53 and 49 and between the pipes 50 and 54, the water pressure from the pipe 53 will be transferred from the piston head 30 to the piston head 26, while the cylinder 25 will be placed in communication with the exhaust pipe 54 whereby the piston rod 29 and the parts carried thereby will be moved toward the right as viewed in Fig. 3, to seat the valve 36 and unseat the valve 37. It therefore, results that the water which has been introduced into the receptacle 15 will now be permitted to flow back through the connection 22 and port 19 into the chamber 61 from which it will pass into the chamber 43 and thence through the pipe 23 to the mixing drum.

As was above stated, where the concrete mixer is being employed at a considerable distance from the source of water supply and connected thereto by a relatively long pipe line, as for example, in paving work, it has been found that upon the cutting off of the water pressure through the operation of the master valve that the knocking commonly known as the water hammer, produces very injurious effects upon the pipes and valves. In order to eliminate this objection, there is shown in Fig. 6, a slightly modified form of the invention in which there is interposed between the pipe 53 and the pilot valve 51, a cushioning air chamber 65. The inlet to this chamber from the pipe 53 is controlled by a ball check valve diagrammatically illustrated at 66, which permits water to flow from the pipe 53 into the chamber and prevents any reverse flow or pressure into the pipe 53. As will be readily understood the air trapped in the chamber 65 serves to cushion the water pressure from the pipe 53 when the flow is suddenly cut off through the operation of the valves and thereby tends to eliminate the knocking or water hammer.

In the form of the invention illustrated in Fig. 7, the cushioning chamber 65 is provided with a piston 67 carried by a piston rod 68 and normally urged downwardly as viewed in the said figure, by means of compression springs 69. The construction not only serves to eliminate the water hammer but it also assists in throwing the master valve pistons from one position to the other as the water pressure is released by the pilot valve 51.

In Figs. 8 and 9, there is shown a further modified form of the invention wherein the master valve is combined with the cushioning chamber and the pilot valve into a single unitary structure. As will be clear from Fig. 8, this is accomplished by modifying one of the end members of the valve body, here shown as member 46, whereby the cushioning chamber 65 is formed as an integral part of the said member, as is also the housing or casing of the pilot valve 51. The operation of this form of the device however, remains the same as that previously described and need not be repeated here.

While several forms of the invention have been illustrated and described, it is obvious that those skilled in the art may vary the details of construction as well as the precise arrangement of parts without departing from the spirit of the invention and therefore, it is not wished to be limited to the above disclosure, except as may be required by the claims.

What is claimed is:

1. In a valve of the class described, a valve body provided with an inlet chamber, an outlet chamber, an intermediate chamber, and a pair of cylinders; a piston mounted in each of said cylinders; a valve member associated with each of said pistons for controlling the flow of fluid from said inlet chamber to said intermediate chamber, and from said intermediate chamber to said outlet chamber; connections for admitting fluid from said inlet chamber to said cylinders; connections for exhausting said cylinders to said outlet chamber; and means for cross-connecting said connections.

2. In a valve of the class described, a valve body provided with a pair of cylinders, an inlet chamber, an outlet chamber, and an interior spaced wall forming an intermediate chamber, the ends of said wall being provided with valve seats; pistons mounted in said cylinders; valve members associated with said pistons and adapted to engage said valve seats to control the flow of fluid from said inlet chamber to said intermediate chamber, and from the latter to said outlet chamber; and means for admitting fluid alternately to said cylinders from said inlet chamber, and alternately exhausting said cylinders to said outlet chamber.

3. In a valve of the class described, a valve body provided with an inlet port, an outlet port, an intermediate chamber in communication with both of said ports, and a pair of cylinders, said intermediate chamber having a third port leading therefrom; a piston mounted in each of said cylinders; a valve member associated with each of said pistons for controlling communication respectively between said inlet port and said chamber, and said outlet port and said chamber, said valve members in one position passing fluid from said inlet port through said chamber to said third port, and in their other position passing fluid from said third port through said chamber to said outlet port; means for admitting fluid from said inlet port to said cylinders; and means for exhausting fluid from said cylinders to said outlet port.

4. In a water supply system for concrete mixers, a supply pipe; a receiving receptacle; a master valve for controlling the flow of water from said pipe to said receptacle; a pilot valve for controlling said master valve; and a cushioning chamber interposed between said supply pipe and said pilot valve, adapted to assist in moving said master valve from one position to another.

5. In a valve for water supply systems of the class described, a valve body; an end member closing one end of said body, said member being provided with an extension; a pilot valve housed in said extension; and a cushioning chamber formed integrally with said extension.

6. In a valve for water supply systems of the class described, a valve body provided with a cylinder; an end member closing one end of said cylinder and having an extension provided with a passage communicating with said cylinder; a pilot valve mounted in said extension, controlling the flow of fluid to said passage and cylinder; and an air cushioning chamber formed integral with said extension.

ERIC O. HAMREN.